United States Patent
Zhou et al.

(10) Patent No.: US 9,934,139 B2
(45) Date of Patent: *Apr. 3, 2018

(54) VIRTUALIZATION IN A MULTI-HOST ENVIRONMENT

(71) Applicant: Fortinet, Inc., Sunnyvale, CA (US)

(72) Inventors: Xu Zhou, San Jose, CA (US); Zengli Duan, San Jose, CA (US); Ziyu Huang, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/600,402

(22) Filed: May 19, 2017

(65) Prior Publication Data

US 2017/0255549 A1     Sep. 7, 2017

Related U.S. Application Data

(63) Continuation of application No. 14/229,513, filed on Mar. 28, 2014, now Pat. No. 9,727,451.

(51) Int. Cl.
  *G06F 12/02* (2006.01)
  *G06F 9/455* (2018.01)
  *G06F 3/06* (2006.01)

(52) U.S. Cl.
  CPC .......... *G06F 12/0238* (2013.01); *G06F 3/061* (2013.01); *G06F 3/0644* (2013.01); *G06F 3/0655* (2013.01); *G06F 3/0683* (2013.01); *G06F 9/455* (2013.01); *G06F 9/45558* (2013.01); *G06F 12/0284* (2013.01); *G06F 2009/45583* (2013.01)

(58) Field of Classification Search
  None
  See application file for complete search history.

(56) References Cited

U.S. PATENT DOCUMENTS

| 6,477,612 B1 | 11/2002 | Wang |
| 2015/0277763 A1 | 10/2015 | Zhou et al. |
| 2016/0005750 A1 | 1/2016 | Widjaja |

OTHER PUBLICATIONS

Notice of Allowance for U.S. Appl. No. 14/229,513 dated Apr. 14, 2017.
Final Rejection for U.S. Appl. No. 14/229,513 dated Dec. 19, 2016.
Non-Final Rejection for U.S. Appl. No. 14/229,513 dated Feb. 1, 2016.

*Primary Examiner* — Midys Rojas
(74) *Attorney, Agent, or Firm* — Hamilton, DeSanctis & Cha LLP

(57) ABSTRACT

Methods and systems for implementing improved partitioning and virtualization in a multi-host environment are provided. According to one embodiment, multiple devices, including CPUs and peripherals, coupled with a system via an interconnect matrix/bus are associated with a shared memory logically partitioned into multiple domains. A first domain is associated with a first set of the devices and a second domain is associated with a second set of the devices. A single shared virtual map module (VMM), maps a memory access request to an appropriate partitioned domain of the memory to which the originating device has been assigned based on an identifier associated with the device and further based on they type of memory access. The VMM causes a memory controller to perform memory access on behalf of the device by outputting a physical address based on the identified domain and the virtual address specified by the request.

13 Claims, 11 Drawing Sheets

800

| Addr | Content | Table |
|---|---|---|
| 1FC | Reserved | |
| 180 | | |
| 17C | Reg15 | |
| | ••• | |
| | ••• | |
| | Reg1 | |
| 140 | Reg0 | Write Cycle Domain Table |
| 13C | Reg15 | |
| | ••• | |
| | ••• | |
| 104 | Reg1 | |
| 100 | Reg0 | Read Cycle Domain Table |
| 0FC | Address Translation Ctrl | |
| | Reserved | |
| 03C | Address Translation reg15 | |
| ••• | ••• | |
| ••• | ••• | |
| 004 | Address Translation reg1 | |
| 000 | Address Translation reg0 | Address Translation Table |

| Bit Name | Bit Position | Description |
|---|---|---|
| Enable | 31 | If all the following conditions are met, incoming address [31:22] replaced with Obase (NOTE2), and address [21:0] remain unchanged, to form the translated address. Conditions:<br><br>• Enable_All bit in Address Translation Ctrl register is 1.<br>• Enable bit in this reg is 1.<br>• Domain of the incoming cycle (obtained through domain translation table) is equal to the Domain bit in this reg.<br>• Incoming address [31:22] is ANDed with Mask, the result of which is equal to Ibase. ) Therefore addresses in Ibase and Obase must be aligned to the block size as determined by Mask.)<br><br>NOTE1: Mask should bear this form: highest M bits are all 1's and lowest N bits are all 0's, where M+N=10.<br><br>NOTE2: Only the highest M bits of address [31:22] are Replaced with the highest M bits of Obase. The lowest N bits of address [31:22] remain unchanged. |
| Domain | 30 | |
| Mask | 29:20 | |
| Obase | 19:10 | |
| Ibase | 9:0 | |

| Bit Name | Bit Position | Description |
|---|---|---|
| Reserved | 31:1 | |
| Enable_All | 0 | 1: Address translation starts to take effect on immediately next clock. From them on, for any incoming address, if no matching or more than one matching is found in those Address Translation registers, address [31:22] will be translated to unpredictable value.<br><br>0: Address translation is bypassed. Incoming address is sent out as is.<br><br>Software can first program all other registers, and turn on this bit as the last step |

| Block | ID encoding | |
|---|---|---|
| CPU 0 | {4'h0, 5'hx} | |
| | {4'h1, 5'hx} | |
| CPU 1 | {4'h2, 5'hx} | |
| | {4'h3, 5'hx} | |
| XP | {4'h4, 5'hx} | |
| | It is further broken down into following encodings: | |
| | VDMA TX | {4'h4, 3'h0, 2'hx} |
| | | 2'hx: See XP top register VDMA_TAG_MAP for details |
| | VDMA RX | {4'h4, 3'h1, 2'hx} |
| | | 2'hx: See XP top register VDMA_TAG_MAP for details |
| | NP DTX | {4'h4, 3'h2, 2'hx} . 2'hx : 4 masters |
| | NP HRX | {4'h4, 3'h4, 2'hx} . 2'hx : 4 masters |
| | NP HTX | {4'h4, 3'h5, 2'hx} . 2'hx : 4 masters |
| | VPN | {4'h4, 3'h6, 2'hx} . 2'hx : 4 masters |
| | DFA | {4'h4, 4'hE, 1'bx} . 1'bx : 2 masters |
| | PKCE | {4'h4, 5'h1E} |
| | MAC | {4'h4, 5'h1F} |
| P2AB_0 | {4'h5, 5'hx} | |
| P2AB_1 | {4'h6, 5'hx} | |
| P2AB_2 | {4'h7, 5'hx} | |
| H2X (USB0, USB1, USB2) | {4'h8, 5'hx} | |
| PCI2AXI | {4'h9, 5'hx} | |
| Others | Reserved | |

FIG. 11

VIRTUALIZATION IN A MULTI-HOST ENVIRONMENT

CROSS-REFERENCE TO RELATED APPLICATIONS

This application is a continuation of U.S. patent application Ser. No. 14/229,513, filed Mar. 28, 2014, now U.S. Pat. No. 9,727,451, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2014-2017, Fortinet, Inc.

BACKGROUND

Field

Embodiments of the present invention generally relate to hardware virtualization in which a common translation mechanism may be used by multiple central processing units (CPUs) and devices coupled to a shared, partitioned memory via an interconnect matrix/bus. In particular, embodiments of the present invention facilitate heterogeneous integration of multiple, potentially proprietary, software applications/environments, by implementing hardware memory virtualization/translation so as to make it appear to each partitioned CPU of the system that their partition of memory is a continuous region starting from a predefined address or configurable base address despite the fact that the same physical memory is being shared by multiple CPUs.

Description of Related Art

Virtualization technologies are becoming prevalent in the market place. Some of the existing technologies provide a virtual hardware abstraction to guest operating systems, and allow them to run in virtual machines in a functionally isolated environment on a host computer without being modified. Virtualization allows one or more virtual (guest) machines to run on a single physical (host) computer, providing functional and performance isolation for processor, memory, storage, etc.

To permit computer systems to scale to larger numbers of concurrent threads, systems with multiple CPUs have been developed. Such multi-processor systems are available as extensions of the PC platform, or as other hardware architectures. Typically, such multi-processor systems connect multiple processors and shared Input/Output (I/O) devices to a shared main memory via an interconnect bus. Virtual machines may also be configured as multi-processor virtual machines. Yet another configuration is found in a so-called "multi-core" architecture, in which more than one physical CPU is fabricated on a single chip, with its own set of functional units (such as a floating-point unit and an arithmetic/logic unit (ALU)), and can execute threads independently; multi-core processors typically share only very limited resources such as some cache. Still another configuration that provides for simultaneous execution of multiple threads is referred to as "simultaneous multi-threading," in which more than one logical CPU (hardware thread) operates simultaneously on a single chip, but in which the logical CPUs flexibly share some resources such as caches, buffers, functional units, etc.

Existing multi-core architectures also include clusters of CPUs, wherein each CPU of a given cluster is different from that of another cluster in terms of its function, architecture, configuration, and construction and therefore are not cache coherent. As such, CPU clusters use different addressing mechanisms, its not possible to implement a shared memory that can support both addressing means without translating message/request from each CPU or associated I/O device into a physical address that is understood at the main memory. At the same time, as CPUs from both the clusters need to be executed in parallel, mechanisms are needed to logically partition and share the main memory such that a virtualization technique can be implemented to translate CPU address to physical memory address. Some virtualization architectures fail to provide address translation mechanisms capable of supporting shared memory access in a heterogeneous environment. Certain solutions offer multi-core virtualization but suffer from assumptions that are made about the memory address map, such as the boot vector address, interrupt vector addresses, and Operating System (OS) entry points. Other solutions require different translation tables and configurations for memory access requests from the partitioned CPUs and I/O devices, which make such virtualization solutions complex and rigid.

In view of the foregoing, there is a need for a virtualization architecture that can support logical partitioning and virtualization for heterogeneous sets of CPU clusters.

SUMMARY

Methods and systems are described for implementing improved partitioning and virtualization in a multi-host environment. According to one embodiment a method of virtualizing access to memory of a system to support multiple domains of the system is provided. Multiple devices operatively coupled with the system are associated with the memory via an interconnect matrix/bus. The devices include multiple central processing units (CPUs) and multiple peripherals. The memory is logically partitioned into multiple domains. A first domain is associated with a first set of the devices and a second domain is associated with a second set of the devices. Responsive to receiving a memory access request via the interconnect matrix/bus from one of the devices, a single shared virtual map module (VMM) of the system, maps the memory access request to an appropriate partitioned domain of the memory to which the device has been assigned based on an identifier associated with the device and further based on type of memory access. The memory access request specifies a virtual address within a virtual address space associated with the domain. The VMM causes a memory controller of the system to perform memory access on behalf of the device by outputting a physical address within a physical address space of the memory based on the identified domain and the virtual address.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 8 illustrates an exemplary register space allocation used for address conversion in accordance with an embodiment of the present invention.

FIG. 9 illustrates an exemplary address translation register used for address conversion in accordance with an embodiment of the present invention.

FIG. 10 illustrates an exemplary address translation control register used for address conversion in accordance with an embodiment of the present invention.

FIG. 11 illustrates an exemplary block/region architecture showing device identifiers/request IDs to which the block corresponds in accordance with an embodiment of the present disclosure.

DETAILED DESCRIPTION

Figure 1:
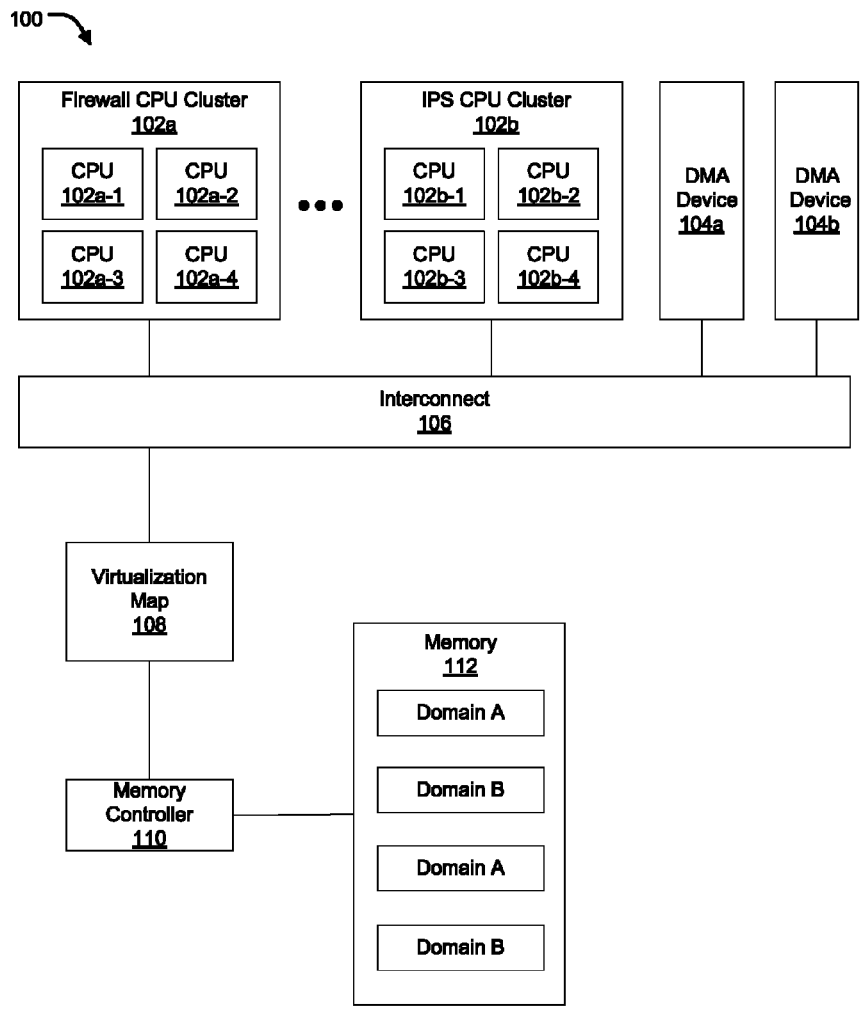
FIG. 1 illustrates an exemplary virtualization system architecture in accordance with an embodiment of the present invention.

Systems and methods are described for implementing improved partitioning and virtualization in a multi-host environment. In accordance with embodiments of the present invention, multi-host environment can include multiple devices, including multiple sets/clusters of heterogeneous central processing units (CPUs) and multiple direct memory access (DMA) capable peripherals, coupled in communication with a shared memory via an interconnect matrix/bus. Each set of CPUs may have a different architecture, cache coherency, operating system and/or function from the other sets. The environment can further include a single shared virtual mapping module that supports efficient memory virtualization by serving as a common point of virtual to physical address translation for memory access requests regardless of the device that issues the memory access request. Notably, the virtual address being translated by the virtual mapping module in various embodiments of the present invention may include a physical address output by a CPU representing a virtual address of the CPU translated by a memory management unit (MMU) of the CPU to a physical address. In the ARM virtualization environment, this address may be referred to as an "intermediate physical address" or IPA.

Methods and systems also provide implementation of virtual memory management in a heterogeneous computing environment, wherein virtual memory is a memory management technique typically implemented using one or both of hardware and software and configured to map memory addresses (virtual addresses) used by a program, into physical addresses in computer memory. Main storage, as seen by a process or a task, appears as a contiguous address space or collection of contiguous segments. Present disclosure also provides apparatus and techniques for implementing a common Virtual Map Module, also interchangeably referred to as VMM or 'VM module' hereinafter, for translating and mapping virtual addresses to physical addresses for a plurality of heterogeneous CPUs and peripherals. Virtual memory can typically be used for freeing applications from having to manage a shared memory space, increased security due to memory isolation, and being able to conceptually use more memory than might be physically available, using the technique of paging.

For the purposes of explanation, CPUs and DMA capable peripherals may be interchangeably referred to as devices from hereon. A person ordinarily skilled in the art can understand that devices that access memory in a heterogeneous environment, not only include CPUs, but also other devices and peripherals, commonly referred to as Direct Memory Access (DMA) supported devices, that are capable of accessing memory space directly. All such CPUs and DMA devices that are referred to in the present disclosure, may use a common shared memory space, wherein the proposed systems and methods integrate technology behind network address translation and mapping for a plurality of devices having different functionalities and cache coherency. Proposed disclosure therefore provides a single address translation table for all devices connected thereto to enable efficient use of shared memory space. Proposed methods and systems further relate to improved techniques for partitioning and implementing virtualization in a heterogeneous multi-host environment, wherein a common translation technique can be used for mapping memory addresses corresponding to different CPUs and peripherals connected in a heterogeneous network. In an aspect, memory of the proposed system can be configured to support a plurality of domains of the system, wherein the method comprises associating a plurality of devices to the memory through an interconnect matrix/bus, wherein the devices can include a plurality of central processing units (CPUs) and a plurality of peripherals. The method can further include logically partitioning memory into a plurality of domains in which a first domain of the plurality of domains can be associated with a first set of devices selected from the plurality of devices, and a second domain of the plurality of domains can be associated with a second set of devices from the plurality of devices. The method can further include, responsive to receiving a memory access request via the interconnect matrix/bus from a device of the plurality of devices, mapping, by a single shared virtual map module of the system, the memory access request to a partitioned domain of the plurality of domains of the memory to which the device is assigned based on an identifier associated with the device and further based on type of memory access, wherein the memory access request specifies a virtual address within a virtual address space associated with the domain. Single shared virtual map module can also be configured to enable a memory controller of the system to perform memory access on behalf of the device by outputting a physical address within a physical address space of the memory based on the identified domain and the virtual address.

According to one embodiment, virtualization system of the present disclosure can include a memory device association module, a memory partition module, a domain mapping module, and a physical address generation module. Memory device association module can be configured to associate a plurality of devices operatively coupled with the system to a memory by means of an interconnect matrix/bus, wherein the plurality of devices can include a plurality of central processing units (CPUs) and a plurality of peripherals;

Memory partition module can be configured to logically partition memory into a plurality of domains, wherein a first domain, for instance, can be associated with a first set of devices selected from the plurality of devices, and a second domain can be associated with a second set of devices from the plurality of devices. Each domain can be mapped to corresponding logical partition in memory. In an instance, in context of a heterogeneous integrated network gateway system having two CPUs, one for performing firewall related functionality (CPU_1) and other for performing intrusion prevention system (IPS) related functionality (CPU_2), the memory can be partitioned into two domains, one for each CPU, wherein each domain can be divided into multiple regions of different sizes in a non-sequential order in the memory, say for instance, into 8 regions for each domain.

Domain mapping module can be configured to process a memory access request received via interconnect matrix/bus from a device by mapping the memory access request to a partitioned domain of the plurality of domains of the memory to which the device is assigned based on an identifier associated with the device and further based on type of memory access (such as read or write). Memory access request may also be required to specify a virtual address within a virtual address space associated with the domain so that an exact mapping to the matching physical address can be done. Identifier specified in memory access request can be indicative of the domain to which the request pertains. In an embodiment, translation of virtual address to physical addresses for read and write requests may require use of separate tables and logics for supporting concurrent read and write accesses and facilitating inter-domain devices that might read from one domain and write to another domain. Domain mapping module can therefore be operatively coupled with a mapping translation table configured to take a device identifier and memory access type as an input and generate a domain applicable to the desired memory access request. Memory access request can further include, be sent along with, or otherwise be associated with a virtual address specified by the requesting device, which can be translated into a corresponding physical address within the physical address space of the shared memory.

According to one embodiment, physical address generation module can be configured to use a memory controller of the system to perform memory access on behalf of the device by outputting a physical address within a physical address space of the memory based on identified domain and virtual address. In an aspect, physical address generation module can be operatively coupled with a translation table that takes virtual address and translates the virtual address into a physical address based on the identified domain (and possibly also the type of memory access). In some embodiments, memory access requests issued by DMA capable I/O devices can be processed in a similar manner, thereby avoiding complexity of existing systems that otherwise require different address translation mechanisms for each device or for different types of devices.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the present disclosure could be accomplished by modules, routines, subroutines, or subparts of a computer program product.

Notably, while embodiments of the present invention may be described using modular programming terminology, the code implementing various embodiments of the present invention are not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM®, ColdFire®, GPU, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

FIG. 1 illustrates an exemplary virtualization system architecture 100 in accordance with an embodiment of the present invention. According to one embodiment, system 100 can comprise a plurality of heterogeneous devices including Central Processing Units (CPUs) such as Firewall CPU Cluster 102a, IPS CPU Cluster 102b, and peripheral devices such as DMA devices 104a and 104b. CPU clusters 102a and 102b can also be collectively referred to as CPU clusters hereinafter, wherein each cluster such as 102a can further include multiple CPUs such as 102a-1, 102a-2, 102a-3, 102a-4, among others. Similarly, cluster 102b can further include multiple CPUs such as 102b-1, 102b-2, 102b-3, 102b-4, among others. A cluster can be considered as a set of processors that are coupled to each other generally by means of LAN cables and work together so as to improve the performance/speed of executing an instruction. Heterogeneous network represented in the instant disclosure can include a plurality of such clusters, each having one or more devices/processors. Individual CPUs may differ from others based on cluster to which they belong, their make, model, architecture, cache coherence, processing speed, among other attributes. Each CPU 102 can also include one or more single or multi core processors. Moreover, each cluster may incorporate different OS. For explanation purposes, it can be interpreted hereinafter that Cluster 102a performs firewall related functionalities, while Cluster 102b performs IPS functions.

In one aspect, system 100 can include a multi-core, heterogeneous processor having a first set of processor cores of a first type, a second set of processor cores of a second type, and can also include partition management software, wherein the partition management software allocates a portion of the first set of processor cores to a partition in the heterogeneous multi-core processor and allocates a portion of the second set of processor cores to the partition.

Apart from CPUs, other devices such as graphics processing unit (GPUs), accelerated processing units (APUs) can also be included. CPU 102 can include one or more of a control processor, field programmable gate array (FPGA), application specific integrated circuit (ASIC), or digital signal processor (DSP). CPU 102, for example, executes control logic, including OS, KMD, SWS, and applications, which controls operation of system 100. In this illustrative embodiment, CPU 102, according to one embodiment, initiates and controls execution of applications by, for example, distributing the processing associated with that application across the CPU 102 and other processing resources, such as the APD 104.

DMA devices 104a and 104b, collectively referred to as DMA devices or peripheral devices 104 hereinafter, can be configured to perform Input/Output functions, wherein the Direct Memory Access (DMA) capable peripherals access the memory space directly without processing their requests through CPUs, thereby reducing processing load on the CPUs. One should appreciate that any number of CPU's, independently or as part of a defined cluster, can be incorporated/configured in the system 100 in order to access and/or process content from memory 112 through an interconnect 106. Similarly, any number and/or type of different peripheral devices such as 104a and 104b can also be incorporated in system 100 such that CPUs and peripheral devices can be homogeneous and/or heterogeneous with each other and can commonly use the interconnect 106 to access memory 112. It will be apparent to those of ordinary skill in the art that a heterogeneous network may contain more or fewer devices than that depicted in the FIG. 1.

Interconnect 106 can include an interconnection matrix/bus, wherein all or part of communication, to and from all the devices, to memory 112, can travel through the interconnect 106 such as, an Advanced eXtensible Interface (AXI) interconnect bus, which can have the capability of identifying the source of any request. In an aspect, system 100 can further include a virtualization map 108 that is configured to act as an interface between interconnect 106 and memory 112, wherein map 108 is configured to receive a memory access request from one of the devices and map the request to an appropriate location in memory 112 by identifying, translating and mapping a virtual address received from the device (102 and/or 104) to a physical address within memory 112. Memory controller 110 can be configured to receive a translated physical address and enable the concerned device to access the desired location in the memory 112.

In an aspect of the disclosure, memory 112 can be logically partitioned into a plurality of domains in which, say a first domain A can be associated with a first set of devices such as a cluster 102a, and a second domain B can be associated with a second set of devices such as cluster 102b. Similarly, N number of domains can be created within memory 112 based on the device and type thereof that the domain is associated with. Once partitioned, map 108 can be configured to receive a memory access request via interconnect matrix/bus 106 from one of the devices/clusters, and map the memory access request to a partitioned domain (A, B, . . . , N) of the plurality of domains of the memory 112 to which the device is assigned based on an identifier associated with the device (102 and/or 104) and further based on type of memory access. Map 108 therefore, from the memory access request, retrieves the identifier associated with the request and maps the identifier to the relevant domain of the memory 112. Along with the identifier, type of request such as read-request or write-request, can also be used to determine the domain to which the device/access request is to be mapped as mapping tables may be different for different types of memory access requests.

In another aspect, in addition to identifier and type of request, memory access request can also be configured to specify a virtual address within a virtual address space associated with the domain. Memory controller 110 can be configured to perform memory access on behalf of the device by outputting a physical address within a physical address space of the memory 112 based on the identified domain and the virtual address. In sum, map 108 can retrieve the domain to which the device pertains, and controller 110 can be configured to take the retrieved domain and virtual address as input and output the physical address within a physical address space of the memory 112.

Figure 2:
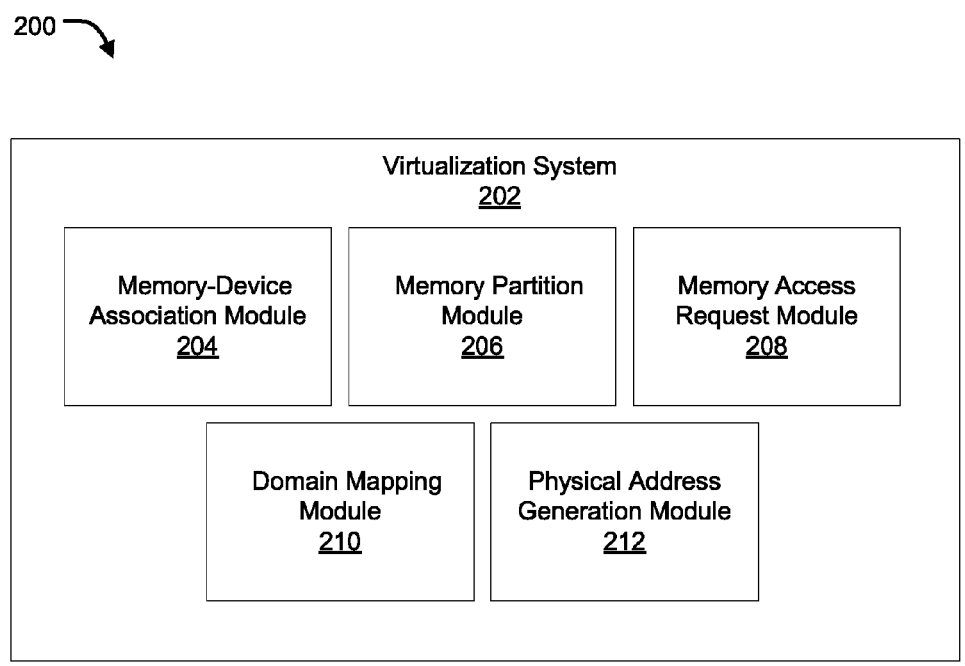
FIG. 2 illustrates exemplary functional units of a virtualization system in accordance with an embodiment of the present invention.

FIG. 2 illustrates exemplary functional units 200 of a virtualization system 202 in accordance with an embodiment of the present invention. In the context of the present example, virtualization system 202 includes a memory device association module 204, a memory partition module 206, a memory access request module 208, a domain mapping module 210, and a physical address generation module 212. Those of ordinary skill in the art will appreciate that these modules can be further divided into sub-modules. Similarly, one or more modules can also be combined together to implement functionality that is indicative of both the modules. For instance, domain mapping module 210 can be configured to include and incorporate functionality of memory access request module 208.

According to one embodiment, memory device association module 204 can be configured to associate a plurality of heterogeneous devices such as CPUs and peripheral devices (such as DMA devices) with a main memory (such as random access memory (RAM)) by means of an interconnect matrix/bus. Such an association between devices and memory can be direct and/or indirect. In one aspect, association between devices and memory can be secured by an address protection code or by a suitable cryptographically enforced memory credential that can be generated by an appropriate host gateway (HG) when an I/O request is passed from a user to a device controller (DC), and then validated by the HG when the DC accesses the user memory. Such a mechanism is called a Protected DMA (PDMA). In another aspect, one or more devices, based on their type, characteristic, purpose, among other parameters can be classified in a cluster or a group, enabling formation of a set of clusters, wherein each cluster includes a defined number devices, which can either be CPUs, such as one or more firewall/IPS CPUs, or can be peripheral devices, or a combination of both. Heterogeneous multi-processor systems can use different types of processors having different functionalities and programming models. Heterogeneous devices may therefore run on multiple operating systems that are essentially unaware of each other but share a common memory system. In yet another aspect, memory can include, but is not limited to, DDR memory, DRAM, SRAM, FLASH and the like, where data is being stored. Memory can either be on-chip memory or an external memory.

According to one embodiment, communication paths interconnecting various components may be implemented using any suitable protocol, such as PCI (Peripheral Component Interconnect), PCI Express (PCI-E), AGP (Accelerated Graphics Port), HyperTransport, or any other bus or point-to-point communication protocol(s).

In another embodiment, main memory can be controlled by means of a memory controller used for virtualization and sharing of integrated circuit resources, wherein the memory controller can be operatively coupled with a virtualization map that is operatively connected with the interconnect and is configured to receive and process access requests for the memory from one or more devices. Memory controller can have an interface to accept memory access messages/requests from one or more devices through the virtualization map, and process virtual address present in the requests to obtain corresponding physical memory address in the main memory to the requesting device. Memory controller may be enabled using state machine and combinational logic. Alternately, portions of memory controller may be enabled as a software application comprises of processor instructions stored in memory, which are executed by a processor.

Memory partition module 206 can be configured to logically partition main memory into a plurality of domains, wherein a first domain, for instance, can be associated with a first set of devices, and a second domain can be associated with a second set of devices. Each domain can be mapped to corresponding logical partition in the main memory. In an instance, in context of a heterogeneous integrated network gateway system having two sets of CPUs, one set can include CPUs for performing firewall related functionality (CPU_1), and other set can include CPUs for performing intrusion prevention system (IPS) related functionality (CPU_2). In such a case, memory can be partitioned into two domains, one for each set of CPUs. Each domain can be further divided into multiple regions of different sizes in a contiguous or non-contiguous order in the memory. For instance, Domain_1 can be defined for CPU_1 such that all requests from any CPU of the cluster/set/group CPU_1 can be put across to Domain_1. Similarly, Domain_2 can be defined for CPU_2 such that all requests from any CPU of set CPU_2 can be put across to Domain_2. Any or both of the domains Domain_1 and Domain_2 can then further be divided into a defined number of regions, which may or may not be contiguous. For instance, Domain_1 can be divided into 3 regions (Region_11, Region_12, and Region_13) and Domain_2 into a single region (Region_21) such that Region_11 is on the top, followed by Region_21, and then by Region_13, and lastly by Region_12.

According to one embodiment, memory can also be partitioned into further domains at run-time based on the number clusters and/or devices that it is associated with. For instance, with every addition of a single device, the memory can be divided such that an additional domain is formed. The size of each domain can be different and based on the device/cluster that the domain corresponds to. For instance, a first cluster having 5 CPUs may generate more requests when compared with a second cluster having 2 CPUs, and therefore the domain in main memory corresponding to the first cluster may have a larger size when compared with size of the domain corresponding to the second cluster. In an alternate implementation, the size of each domain may be kept the same or consistent. Accordingly, size of regions within each domain may also be different and configurable if desired.

In an embodiment, each domain can be associated with an identifier, which can be mapped to a device and/or a cluster to identify the domain that the device, requesting for memory access, belongs to. Each request issued by a device to store or retrieve data to/from memory, can be associated with the corresponding device identifier, which can then be used by a virtualization map to identify the domain to which the device pertains, based on which access to memory can then be given. For instance, virtualization map can include mapping between device identifiers and domain identifiers to enable identification of a domain that should be accessed for each memory access request from a device.

In an alternate embodiment, device authentication can also be incorporated in the present system, wherein each device can be authenticated based on its device identifier that it submits (as part of memory access request) to determine whether the identifier actually belongs to a valid domain and whether the domain is correctly mapped for the device. Domain mapping between device and memory can be performed during system initialization or when the device is associated with the memory, such that memory controller receives device identifier from the device and maps the same with appropriate memory partition to link/associate the device to the memory for all future communications/data exchanges. Devices that belong to a common cluster C1 therefore may issue different device identifiers (D1, D2, D3, . . . , Dn) but should correspond, in the virtualization map, to the same domain identifier DI_1, so as to access the correct domain of memory. In an implementation, domain identifier can include a series of partition bits that depict actual memory partition from where data is to be fetched or to be written depending on the type of request. Virtualization map can therefore have any structure or construction such as a complex multi-level page table like configuration or a simple table having a device-domain mapping.

Memory access request module 208 can be configured to receive memory access requests from one or more devices. Such requests can either be received in sequence or in parallel from one or more devices/clusters. The proposed system therefore allows heterogeneous devices to issue memory access requests, which are processed in parallel and shared by a single main memory such that each device uses a defined portion of the memory. Memory access requests can be issued in different formats that are defined for different devices/clusters and are processed so as to translate such formats in a common format that is understood and interpretable by the shared memory by means of a single virtualization map, also interchangeably referred to as a translation table in the instant disclosure.

In an implementation, each memory access request can include a device identifier that can be used to determine/map the domain in memory that the device corresponds to. Such mapping can be performed by means of a virtualization map that can store device identifiers mapped with domain identifiers/domains to help determine domain that each device corresponds to. Device identifiers can include any representation in any form/format such as, a globally unique device identifier, a device name, an IP address, a MAC address, among others, that can help uniquely identify the device from which the memory access request has been received. Similarly, such device identifiers can either be directly mapped with the domain name or any other identifier (such as Domain A or DA, or D_A) that can help map the domain to which any device corresponds.

According to one embodiment, each memory access request can further include a request type indicator such as whether the request is a read request or a write request. In another embodiment, memory access request can also include a virtual address that is translated by memory controller into physical address of main memory. Any other field can also form part of the memory access request to help one or a combination of virtualization map, memory controller, and main memory to perform more efficiently. In an instance, memory access request can indicate priority of request, based on the request can be processed/pipelined. Characteristics of the device making the request, cluster/group to which the device pertains, among other like parameters can also be used while processing the request.

Domain mapping module 210 can be configured to process memory access requests received via interconnect matrix/bus from a device by mapping the memory access request to a partitioned domain to which the device is assigned based on an identifier associated with the device and further based on a type of memory access (such as read or write). In an implementation, domain mapping module 210 can be operatively coupled with virtualization map that receives device identifier (identifier) as part of the memory access request and maps the identifier with corresponding domain identifier or domain name in the memory that the device pertains to. Virtualization map can also be configured to receive type of memory access request (read or write) in order to determine domain/partition of memory from where the request is to be processed.

Memory access request may also be required to specify a virtual address within a virtual address space associated with the domain so that an exact mapping to the matching physical address can be done. Such mapping to translate virtual address into physical address can be done by means of a memory controller that can receive a virtual address along with the domain to which the request has been mapped to, by virtualization map, and process the virtual address in one or more regions of the domain to present physical address to the device that has issued memory access request. The identifier specified in the memory access request can therefore be indicative of the domain to which the request pertains. In an embodiment, translation of a virtual address into a physical address for read and write requests may require use of separate tables and logic for supporting concurrent read and write accesses and facilitating inter-domain devices that might read from one domain and write to another domain.

According to one embodiment, mapping module 210 can also be configured to process memory access requests to determine whether a request is valid and acceptable, wherein in case, post initial processing of the memory access request, it is determined that the request is unauthorized, or device identifier is not present in virtualization map, or data/content requested for is not coherent in main memory, the request can be denied/ignored or the request can be mapped with a default memory partition. An appropriate error message can also be presented to the device making such a request.

According to one embodiment, physical address generation module 212 can be configured to use memory controller of the system to perform memory access on behalf of the device by outputting a physical address within a physical address space of main memory based on the identified domain and the specified virtual address. In an aspect, module 212 can be operatively coupled with a translation table that, in conjunction with, or independently, takes a virtual address and translates the virtual address into a physical address based on the identified domain (and possibly also the type of memory access).

Those of ordinary skill in the art will appreciate that although multiple components such as virtualization map, memory controller, translation table are being referred to herein for translation of virtual addresses into correct physical addresses, these components merely form part of an exemplary embodiment, and alternative configurations/constructions/structures can be implemented for enabling identification of a memory domain to which requesting devices pertain and performing appropriate virtual to physical address translation. In an embodiment, memory access requests issued by DMA capable I/O devices can be processed in a similar manner, thereby avoiding complexity of existing systems that otherwise require different address translation mechanisms for each device or for different types of devices.

Those of ordinary skill in the art will also appreciate that many other mapping/translation tables can form part of the system based on the implementation desired. For instance, tables indicative of memory address map, boot vector address, interrupt vector address, OS entry points, among others can also be incorporated in the proposed system. Hardware memory virtualization/translation of the proposed system can also be configured such that each CPU and/or device sees its respective memory partition (domain) as a contiguous region starting from address 0x00000000 even though they share the same physical memory.

Each address translation region can include fields such as translation enable, translation base, translation mask, and translated base, wherein size of each translation region can have the size of 1 M, 2 M, 4 M, to 2 G and can be naturally aligned without overlapping. In an implementation, two sets of translation domains can be implemented for two clusters of CPUs, with each domain including 8 regions. As explained above, the same translation tables may also be used by peripheral DMAs for access to main memory. In another embodiment, different tables can exist to cater to and process different memory access requests based on the type of request (direction of request). For instance, depending on whether the request is a read request or a write request, a different translation domain selection table can be selected.

Figure 3:
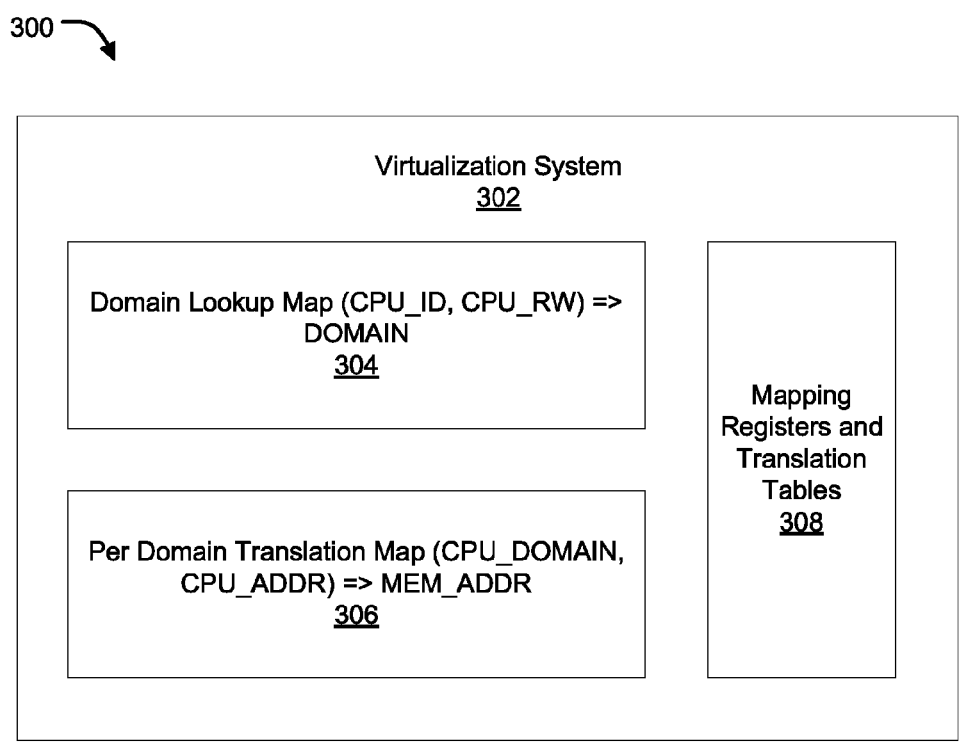
FIG. 3 illustrates exemplary components of a virtualization map module in accordance with an embodiment of the present invention.

FIG. 3 illustrates exemplary components 300 of a virtualization system 302, also interchangeably referred to as virtualization map module 302 hereinafter, in accordance with an embodiment of the present disclosure. In an implementation, virtualization map module 302 can be configured to receive a memory access request from a device such as CPU and/or peripheral device, and identify an appropriate domain of memory to which the device pertains based on an identifier that forms part of the memory access request or is otherwise associated with the memory access request. Therefore, a device identifier that forms part of the memory access request can be used to map the device making the request with a domain in memory that corresponds to the device.

According to one embodiment, virtualization map module 302 can include a domain lookup map 304 that is configured to receive CPU_ID, which equates to device identifier or simply 'identifier', and also to receive a type of memory access request as to whether the request is a read request or a write request, and issue, as output, domain of main memory to which the requesting device pertains. Therefore, CPU_ID (device identifier) and CPU_RW (type of memory access request) can be taken as input by the domain lookup map 304, and then processed with respect to virtualization maps and/or mapping registers and/or translation tables 308 to retrieve the domain of main memory in which the request should be processed.

According to another embodiment, once the domain (CPU_DOMAIN) of main memory has been determined for the instant memory access request, virtual address (CPU_ADDR) that forms part of the request can be processed by Per Domain Translation Map 306 to determine the physical memory address that the request should be processed at. Per Domain Translation Map 306 can also process the domain and virtual address with reference to virtualization maps and/or mapping registers and/or translation tables 308 to determine and present the physical address.

Figure 4:
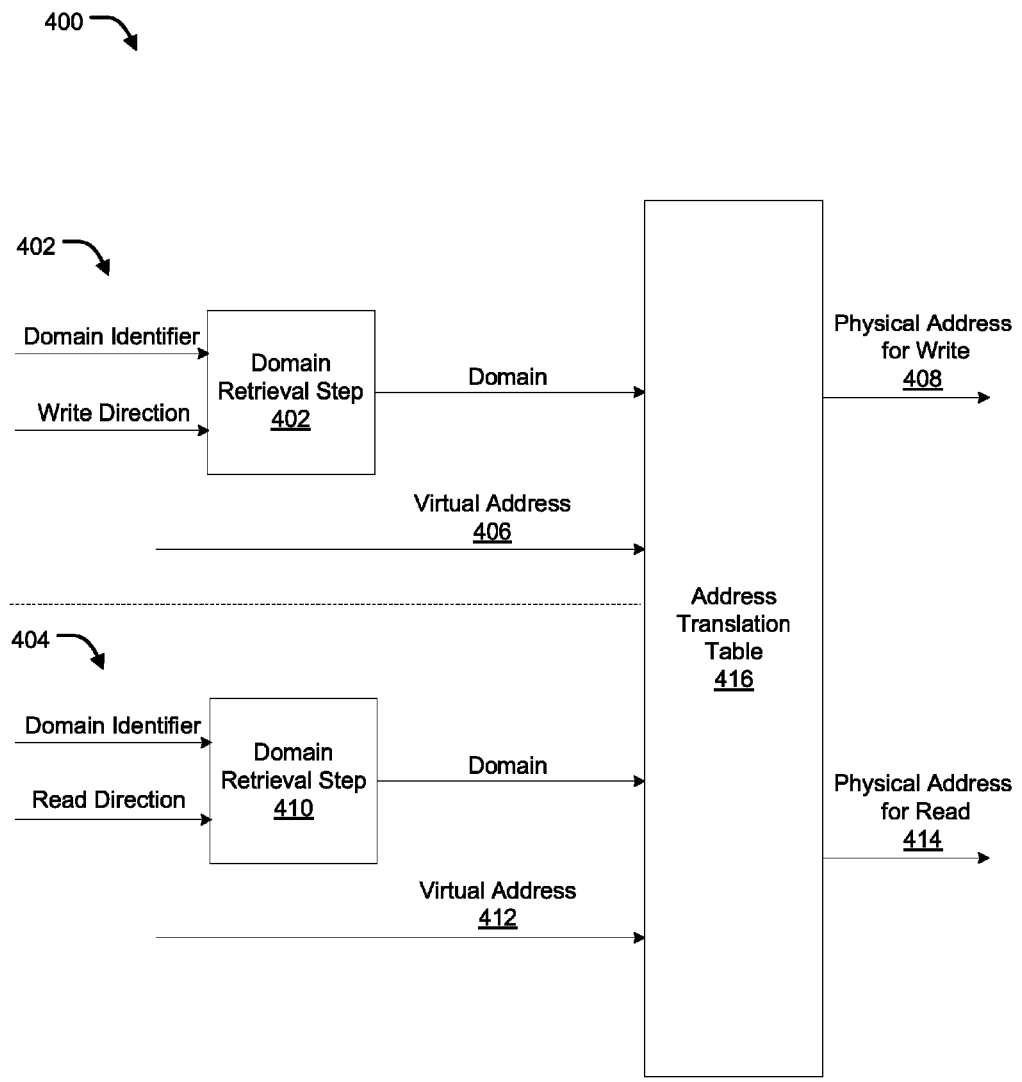
FIG. 4 is a block diagram illustrating address conversion from a CPU specified address to physical memory address in a multi-host environment in accordance with an embodiment of the present invention.

FIG. 4 is a block diagram 400 illustrating address conversion from a CPU specified address to physical memory address in a multi-host environment in accordance with an embodiment of the present invention. Diagram 400 shows both scenarios of how a write request is processed at 402, as well as how a read request is processed at 404. As shown in the write step 402, domain retrieval step 404 can be configured to take device identifier and type of memory access (also interchangeably referred to as direction of memory access) as input, and extract the domain/domain identifier to which the device pertains. Identified domain can then be used along with virtual address 406, supplied either as part of the memory address request or independently, to translate virtual address into physical address 408 for write instructions by means of address translation/mapping/conversion tables 416.

Similarly, for read step 404, domain retrieval step 410 can be configured to take device identifier and type of memory access (also interchangeably referred to as direction of memory access) as input, and extract the domain/domain identifier to which the device pertains. Identified domain can then be used along with virtual address 412, supplied either as part of the memory address request or independently, to translate the virtual address into physical address 414 for read instructions by means of address translation/mapping/conversion tables 416.

Figure 5:
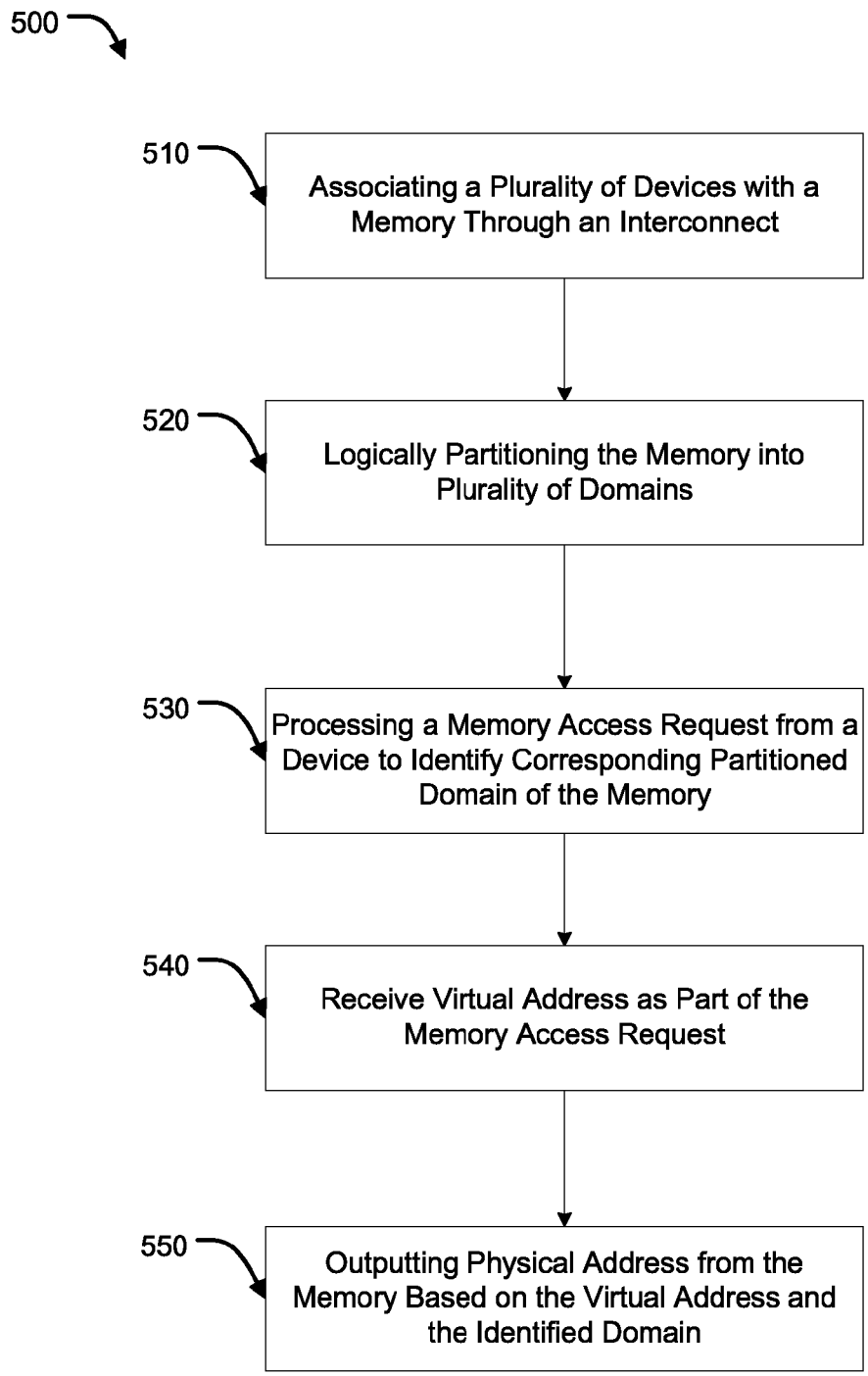
FIG. 5 is a flow diagram illustrating memory address virtualization processing in a multi-host environment in accordance with an embodiment of the present invention.

FIG. 5 is a flow diagram 500 illustrating memory address virtualization processing in a multi-host environment in accordance with an embodiment of the present invention. At step 510, a plurality of devices can be associated with a memory via an interconnect matrix/bus, wherein the plurality of devices can include plurality of central processing units (CPUs) and plurality of peripherals. At step 520, the memory can be logically partitioned into a plurality of domains, wherein each domain can be mapped with a device or a cluster of devices. For instance, a first domain can be associated with a first set of devices, and a second domain can be associated with a second set of devices.

At step 530, responsive to receiving a memory access request via the interconnect matrix/bus from a device of the plurality of devices, virtual map module can map the memory access request to a partitioned domain of the memory to which the device is assigned based on an identifier associated with the device and further based on type of memory access (direction of memory access such as read/write). At step 540, virtual address specified in the memory access request that forms part of virtual address space associated with the domain, is received by memory controller. At step 550, the method comprises causing, by the virtual map module, memory controller to perform memory access by outputting a physical address within a physical address space of the memory based on the identified domain and the virtual address.

Example

Without limitation, FIGS. 6-12 are intended to provide a concrete example of a heterogeneous environment in which embodiments of the present invention may be used. In this particular example, a network gateway device, e.g., a FOR-TIGATE network gateway device, providing firewall, anti-virus and intrusion prevention functionality, is partitioned into two domains. In the present example, the virtualization methodologies described herein allow two vendors to integrate proprietary software into a network gateway device without having to provide source code to the other. One CPU may run a proprietary network device operating system (e.g., FortiOS) based on one version of the Linux operating system (e.g., Linux 2.4) and another CPU may run proprietary software on top of a different version of the Linux operating system (e.g., Linux 2.6). Advantageously, the hardware virtualization discussed above makes this kind of heterogeneous integration possible without requiring either vendor to know the implementation details of the other's proprietary code.

Figure 6:
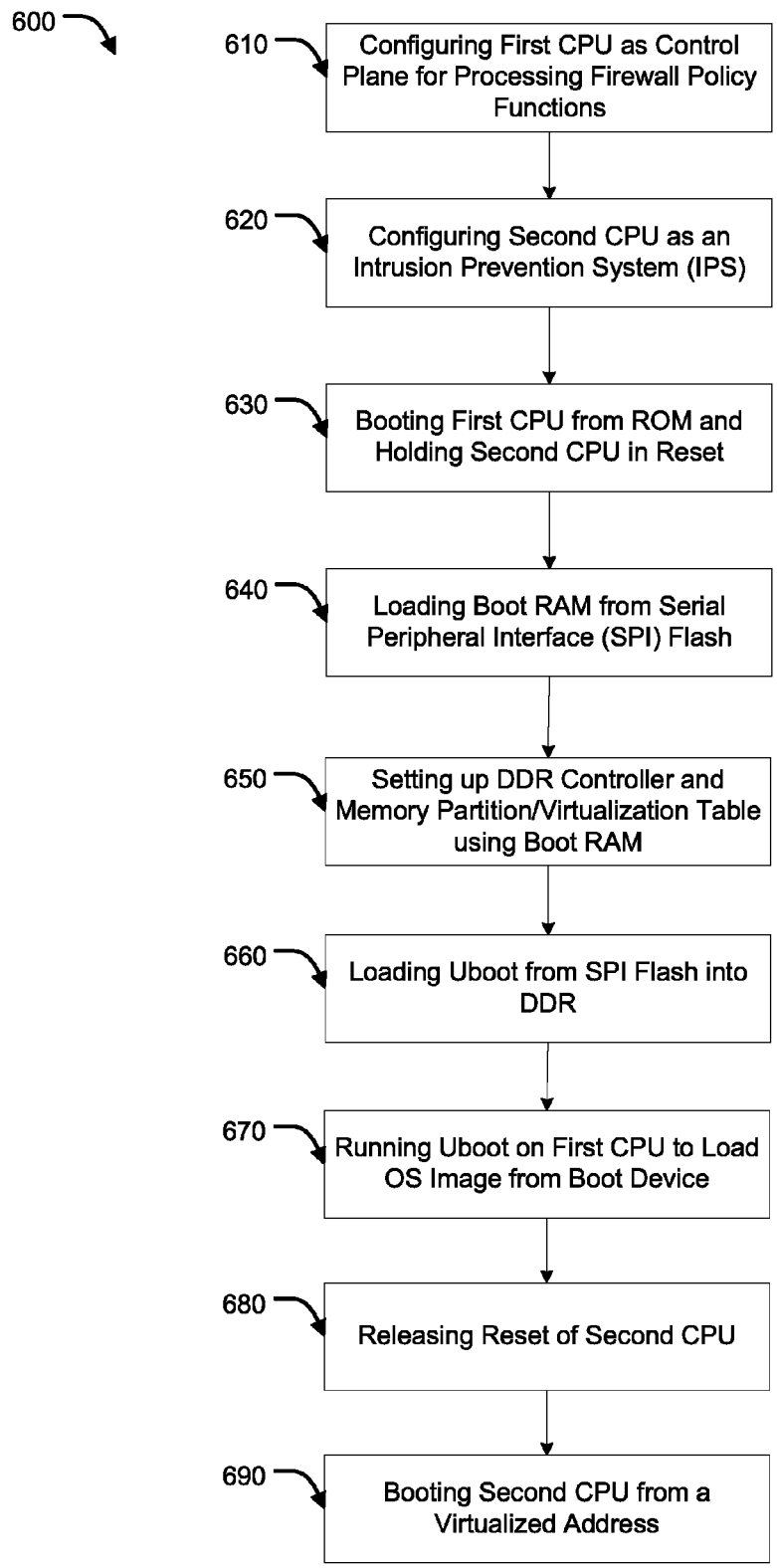
FIG. 6 is a flow diagram illustrating boot process for two heterogeneous groups of CPUs in accordance with an embodiment of the present invention.

FIG. 6 is a flow diagram 600 illustrating boot process for two heterogeneous groups of CPUs in accordance with an embodiment of the present invention. For the purpose of illustration, at step 610, a first cluster/group of CPUs is configured to act as a control plane for processing firewall policy functions. Such CPUs can have functions relating to checking of firewall policy, session setup, tear-down, etc. Any other function can always be configured by a defined number of CPUs and such functions/configurations of CPUs are within the scope of the instant disclosure. Similarly, at step 620, a second cluster/group of CPUs is configured as an Intrusion Prevention System (IPS). Any number of groups/CPUs and/or allied devices can therefore be configured within the present disclosure such that each CPU can run an independent OS (such as FortiOS and Linux) and software on the partitioned (into domains) main memory.

At step 630, first CPU (interchangeably referred to as first set of CPUs) is booted from Read Only Memory (ROM) from location such as 0xFFFF0000, while second CPU is held in Reset state. Such action of booting the first CPU can be initiated after the system reset is de-asserted. At step 640, Boot Random Access Memory (RAM) code can be loaded from Serial Peripheral Interface (SPI) flash. At step 650, Boot RAM can be used for setting up Memory (such as Double Data Rate (DDR)) Controller (Element 110 of FIG. 1) along with setting up memory partition/virtualization table, also referred to as virtualization map or translation tables hereinafter. Any other alternate measure for setting up the memory controller and virtualization tables can also be incorporated, and using Boot RAM is only one of the mechanisms. At step 660, post setup of memory partition/virtualization tables and memory controller, or along with the setup, Uboot can be loaded from SPI flash into the main memory (DDR).

At step 670, Uboot loaded into DDR memory can be run on first CPU in order to load respective Operating System (OS) images from boot device onto both the first CPU and the second CPU. At 680, once the functioning of first CPU is over or is ongoing, at a desired instant, reset of second CPU can be released, and at step 690, second CPU can be booted from a virtualized address (such as 0x00000000), at which point the first CPU can jump the OS entry point.

Figure 7:
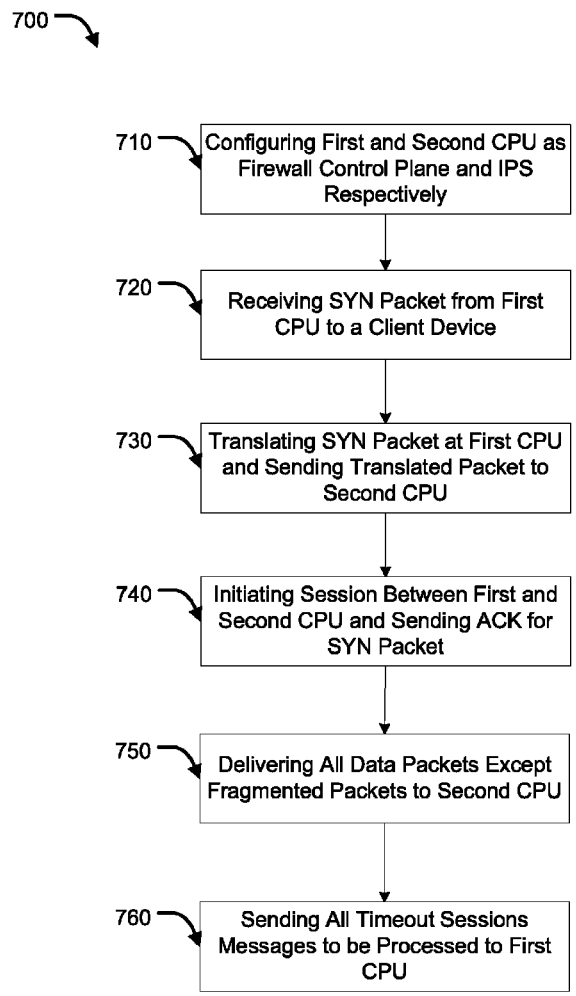
FIG. 7 is a flow diagram illustrating packet flow process for two heterogeneous groups of CPUs in accordance with an embodiment of the present invention.

FIG. 7 is a flow diagram 700 illustrating packet flow process for two heterogeneous groups of CPUs in accordance with an embodiment of the present invention. At step 710, first CPU is configured as a firewall control plane, and second CPU is configured as an Intrusion Prevention System (IPS). At step 720, synchronize (SYN) packet can be received at the first CPU from a client device. At step 730, first CPU can send translated SYN packet to second CPU along with other information such as sensor ID information. SYN packet can be translated by means of an appropriate network address translation (NAT) table, and can then sent to second CPU by means of a DMA queue or any other means such as NPLite. At step 740, a trap session can be initiated between first and second CPU to enable SYN-ACK (acknowledgement of SYN packet) to be issued by any or both of the first and second CPUs.

At steps 750 and 760, post creation of a session, method can be configured to enable all data packets except fragmented packets to be processed by second CPU and all session timeout messages to be processed by first CPU. Similarly, RST (Reset) and FIN (Finish) packets can be accordingly processed at first and second CPU's based on their configuration, after the transaction data packets have been processed.

FIG. 8 illustrates an exemplary register space allocation 800 used for address conversion in accordance with an embodiment of the present invention. As seen, each domain has multiple regions that can be mapped through a plurality of translation tables, wherein, depending on type of request (read or write) and device identifier, an appropriate table from where the desired domain of main memory can be identified, can be selected. For instance, in view of FIG. 8, in case the type of request from a device is a write request, translation table at address 140 can be accessed, and in case the type of request from a device is a read request, translation table at address 100 can be accessed. Register can therefore be configured as a component of virtualization map and can include address translation table(s), read cycle domain tables, and write cycle domain tables. Details as to address translation data along with read and write information can be maintained in the Register.

In an implementation, an address translation register defines a region of at least 4 MB in size. Address translation table can be programmed such that any possible AXI address plus domain can match only one Address Translation Register. Translation can be asynchronous, i.e., without adding any clock delay. Because read and write cycles use separate tables and logic, they can be processed concurrently. Domain bit tables for read and write requests can be separate. Each domain bit table can have 512 bits, allowing ID of the width [8:0] to index to a domain bit. Tables can be accessed in the unit of a 32-bit register.

FIG. 9 illustrates an exemplary address translation register 900 used for address conversion in accordance with an embodiment of the present invention. Address translation control primarily has two main elements to perform translation, which can be implemented through two registers namely, Address Translation Register and Address Translation Control Register. Descriptive structure of Address Translation Register is shown with reference to FIG. 9, wherein the description given in 900 is not exhaustive but merely for giving an exemplary view of the register for the sake of understanding. As shown, of the 32 bits, bits 0-9 represent Ibase and bits 10-19 represent Obase. Bits 20-29 represent Mask bits and bit 30 represents the Domain to which the device pertains. Conditions that enable working of the address translation table are represented in FIG. 9.

FIG. 10 illustrates an exemplary address translation control register 1000 used for address conversion in accordance with an embodiment of the present invention. Enable ALL flag in the translation control register 1000 decides whether address translation is to be performed or not. When its value is 0, incoming address is sent out as it is and the address translation process is bypassed. On the other hand, when its value is 1, address translation register 900 is checked for matching addresses. If no match, or more than one match, is found in the translation registers, incoming address can be translated into an unpredictable value and sent out. Bits from 1-31 can be reserved.

According to one embodiment, as mentioned above, physical memory can be divided into different domains. When any device requests memory access, it starts by sending a memory access request, which can be accompanied by information including a Request ID such as a device identifier, a virtual memory address, and type of request. Request ID enables virtualization map to identify the domain to which the request should be sent for processing. Each device can be assigned a particular device identifier, which corresponds to a specific domain. In an implementation, device identifier/request ID can have a width of 9 bits, enabling up to a maximum of 512 IDs that can be used as index in domain bit table to find domain information.

Each domain, on the other hand, can further be subdivided into different blocks/regions such that each block maps to one or more unique request IDs/device identifiers. FIG. 11 illustrates an exemplary block/region architecture 1100 showing device identifiers/request IDs to which the block corresponds in accordance with an embodiment of the present disclosure. As shown, block 1100 can be configured to receive requests for clusters CPU0, CPU1, XP, P2AB_0, P2AB_1, P2AB_2, H2X, and PCI2AXI, wherein the CPU0 can, for instance, have 2 CPUs having identifiers {4'h0, 5'hx} and {4'h1, 5'hx}. Similarly, CPU1 can, for instance, also have 2 CPUs having identifiers {4'h2, 5'hx} and {4'h3, 5'hx}. Similar configuration can also be done for DMA devices or other peripheral devices such as H2X and PCI2AXI that form part of the system and are configured to access shared physical memory.

Figure 12:
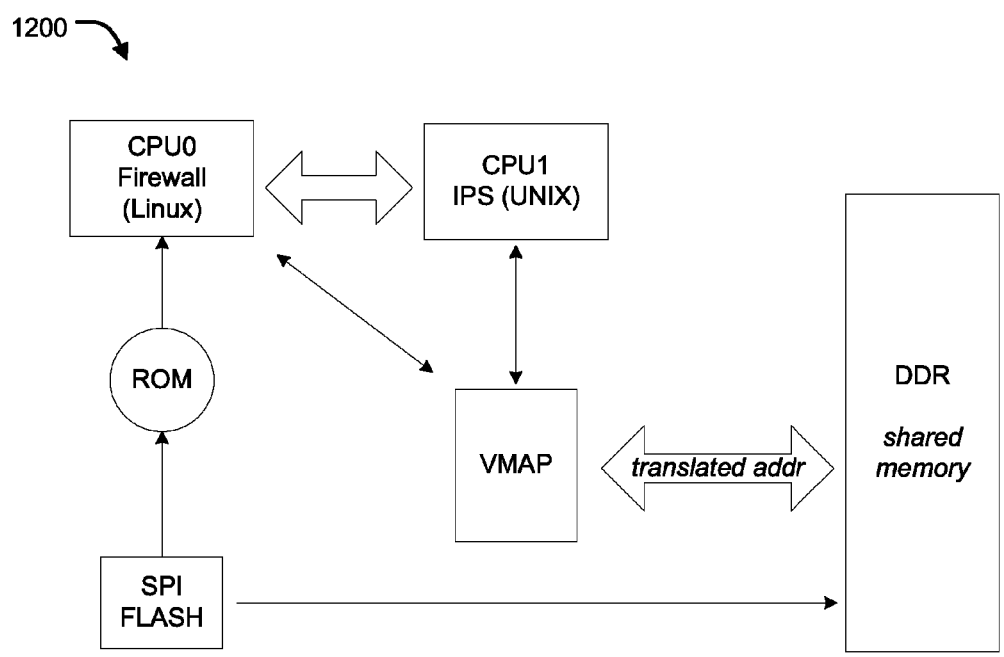
FIG. 12 illustrates a control flow depicting system architecture in accordance with an embodiment of the present invention.

FIG. 12 illustrates a control flow depicting system architecture 1200 in accordance with an embodiment of the present invention. As shown, architecture 1200 can include two clusters/devices CPU0 (Firewall that is based on Linux) and CPU1 (IPS based on UNIX) that are operatively coupled with each other. Both the CPUs can be operatively coupled with a Virtualization Map (VMAP) in order to access partitioned physical memory (DDR). DDR can therefore be divided into two domains, each having one or more contiguous/non-contiguous regions/blocks. During access, even though both CPUs think that they are using the whole contiguous memory space starting from 0x00000000, they are actually using a shared non-contiguous memory space. During the boot process, a Read Only Memory (ROM) component, which is a non-volatile memory component storing Boot RAM code, can be operatively coupled with a SPI flash component, which is also a non volatile memory storing the Universal Bootloader (Uboot), in order to load OS images from storage into main memory. Main memory, which is represented herein as DDR memory, can be a volatile memory.

Some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method of providing virtualized access to a shared memory of a network gateway system on behalf of a plurality of heterogeneous devices within the network gateway system, which are communicatively coupled to the shared memory via an interconnect, the method comprising:

associating each device of the plurality of heterogeneous devices with one of a plurality of domains of the shared memory by logically partitioning the shared memory into the plurality of domains and creating a mapping between an identifier associated with the device and a domain of the plurality of domains that is maintained by a single shared virtual map module of the network gateway system;

responsive to receiving a memory access request from a particular device of the plurality of heterogeneous devices via the interconnect, mapping, by the single shared virtual map module, the memory access request to an appropriate domain of the plurality of domains based on an identifier associated with the particular device, wherein the memory access request specifies a virtual address within a virtual address space of with the appropriate domain; and causing, by the single shared virtual map module, a memory controller of the network gateway system to perform a memory access on behalf of the particular device by outputting a physical address within a physical address space of the memory based on the identified appropriate domain and the virtual address.

2. The method of claim 1, wherein the plurality of heterogeneous devices comprise a plurality of central processing units (CPUs) running different versions of an operating system or running different operating systems.

3. The method of claim 2, wherein the plurality of heterogeneous devices include one or more Input/Output (I/O) devices and one or more direct memory access (DMA)-capable peripherals.

4. The method of claim 1, further comprising concurrently mapping, by the single shared virtual map module, a first memory access request specifying a write operation and a second memory access request specifying a read operation, by performing a first address translation for the first memory access request using one or more registers of a write cycle domain table and performing a second address translation for the second memory access request using one or more registers of a read cycle domain table.

5. The method of claim 1, wherein said mapping comprises extracting a domain bit from the identifier associated with the particular device based on a type of memory access specified by the memory access request.

6. The method of claim 5, wherein said outputting the physical address comprises translating the virtual address based on an address translation table and the domain bit.

7. The method of claim 6, wherein the address translation table is stored within on chip memory of the memory controller.

8. The method of claim 6, wherein the address translation table is stored within a memory external to the memory controller.

9. The method of claim 1, wherein the shared memory comprises double data rate (DDR) synchronous dynamic random access memory (SDRAM).

10. The memory of claim 1, wherein plurality of heterogeneous devices comprises two sets of CPUs, wherein the plurality of domains comprises two domains and wherein memory access requests originated by the two sets of CPUs are processed by respective domains of the two domains.

11. A method of comprising:
- logically partitioning a shared memory of a network gateway system of a protected network into a first domain and a second domain, wherein the first domain is associated with a first Central Processing Unit (CPU) within the network gateway system, and the second domain is associated with a second CPU within the network gateway system;
- receiving a synchronize (SYN) packet by the first CPU from a client device residing outside of the protected network;
- forwarding the SYN packet to the second CPU based on a network address translation (NAT) table;
- establishing a session between the first CPU and the second CPU based on an acknowledgement of the SYN packet issued by one or both of the first CPU and the second CPU;
- processing subsequently received packets associated with the session by causing the subsequently received packets to be delivered to the second CPU and causing timeout messages associated with the session to be delivered to the first CPU;
- responsive to receiving a first memory access request from the first CPU:
  - mapping the first memory access request to the first domain based on a first identifier associated with the first CPU, wherein the first memory access request specifies a first virtual address within a virtual address space associated with the first domain; and
  - accessing the shared memory on behalf of the first CPU by outputting a first physical address within a physical address space of the shared memory based on the first domain and the first virtual address;
- responsive to receiving a second memory access request from the second CPU:
  - mapping the second memory access request to the second domain based on a second identifier associated with the second CPU, wherein the second memory access request specifies a second virtual address within the virtual address space associated with the second domain; and
  - accessing the shared memory on behalf of the first CPU by outputting a second physical address within the physical address space of the shared memory based on the second domain and the second virtual address.

12. The method of claim 11, wherein the first CPU runs a first type of operating system and the second CPU runs a second type of operating system.

13. The method of claim 11, wherein the first CPU acts as a control plane for managing firewall policy and the second CPU acts as an Intrusion Prevention System (IPS).

* * * * *